UNITED STATES PATENT OFFICE 2,466,679

2-ACYL-2-(δ-CYANOBUTENYL)-CYCLOALKANONES

Herman A. Bruson, Rydal, and Thomas W. Riener, Philadelphia, Pa., assignors, by mesne assignments, to Rohm & Haas Company, Philadelphia, Pa., a corporation of Delaware No Drawing. Application June 26, 1947, Serial No. 757,345

11 Claims. (Cl. 260—464)

This invention relates to 2-(4'-cyano-2'-butenyl)-2-acyl cycloalkanones and to a method by which they are formed.

These new compounds result from the addition of 1-cyano-1,3-butadiene,

to a cycloalkanone having an acyl group and hydrogen in the 2-position,

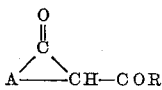

under the influence of an alkaline condensing agent. The formation of the new compounds involves not only addition but also a shift of the double bond. This outcome is not that to be expected from reactions of somewhat similar olefinic compounds nor from other reactions of cyanobutadiene.

The reaction is performed with 2-acyl cycloalkanones of the formula

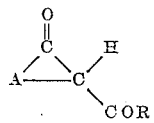

wherein A is a saturated open chain of three to eight carbon atoms and R is a hydrocarbon group, particularly an alkyl group of one to three carbon atoms. The 2-acyl cycloalkanones of greatest present interest are the 2-acyl cyclopentanones and 2-acyl cyclohexanones. Typical cycloalkanones which may be used are 2-acetyl cyclopentanone, 2-propionyl cyclopentanone, 2-butyryl cyclopentanone, 2-benzoyl cyclopentanone, 2-acetyl cyclohexanone, 2-propionyl cyclohexanone, 2-butyryl cyclohexanone, 2-acetyl cycloheptanone, 2-acetyl cyclooctanone, 2-acetyl cyclodecanone, 2-propionyl cycloheptanone, and the like. The cycloalkanone ring can carry nuclear hydrocar-substitutents in a position other than the 2-position where the acyl group is located along with hydrogen. These substituents may be acyclic or cyclic, as in 2-acetyl-4-tert.-butyl cyclohexanone, 2-acetyl-4-phenyl cyclohexanone, 2-acetyl-4-benzyl cyclohexanone, 2-acetyl-4-cyclohexyl cyclohexanone, 2-acetyl-4-tert.-amyl cyclohexanone, or 2-propionyl-6-methyl cyclohexanone.

As alkaline catalysts for promoting the reaction between 1-cyano-1,3-butadiene and the 2-acyl cycloalkanone, there may be used the oxides, hydroxides, amides, hydrides, cyanides, or alcoholates of the alkali metals or the alkali metals themselves. Likewise, there may be used the strongly alkaline organic hydroxides, such as the quaternary ammonium hydroxides. Typical of these are benzyl trimethyl ammonium hydroxide and dibenzyl dimethyl ammonium hydroxide. The commercial 40% aqueous solutions of these are highly effective.

The catalyst is suspended or dissolved in the 2-acyl cycloalkanone or in a mixture of the 2-acyl cycloalkanone and an inert organic solvent such as dioxane, ether, benzene, toluene, naphtha, or tert.-butyl alcohol. The quantity of alkaline condensing agent or catalyst which is needed is relatively small. Amounts of 1% to 10% of the weight of the 2-acyl cycloalkanone are usually sufficient. The cyanobutadiene is then added to the acyl cycloalkanone in approximately molecularly equivalent amount.

Temperatures of reaction are usually between 25° C. and 100° C. It is desirable to effect the reaction under controlled conditions without permitting the temperature to rise greatly. This may require external cooling in some cases. In cases where the size of acyl group or hydrocarbon substituent causes the reaction to be sluggish, the temperature is desirably raised to accelerate the reaction.

In the presence of an alkaline condensing agent, the following reaction occurs between one mole of an acyl cycloalkanone and one mole of 1-cyano-1,3-butadiene:

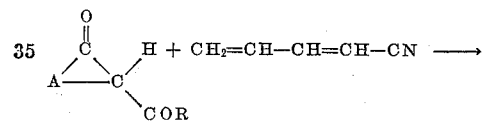

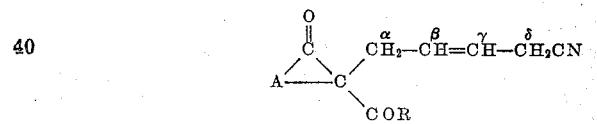

The product may be termed a 2-acyl-2-(δ-cyanobutenyl)-cycloalkanone. The cyanobutenyl group appears to be labile in the presence of strong alkalies, and it may behave as though it were the γ,δ-unsaturated group. The 2-acyl-2-(4'-cyanobutenyl)-cyclopentanones and -cyclohexanones may be reacted with water and a hydrolytic agent such as a strong base or acid, sodium hydroxide, potassium hydroxide, barium hydroxide, hydrochloric acid, and sulfuric acid being examples of such agents, to cleave the ring at the 1,2-linkage and to hydrolyze the nitrile group with formation of new dicarboxylic acids or their salts,

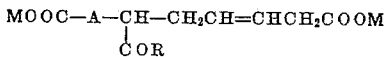

which may be converted to esters by conventional reaction with alcohols. The esters are excellent plasticizing agents. The acids may also be used for the preparation of resins by reaction with polyhydric alcohols. The new acyl cyanobutenyl cycloalkanones may also be reduced as to the olefinic linkage and the cyano group.

A side reaction in the case of five- and six-membered rings is the splitting out of the 2-acyl group and subsequent hydrolysis of the nitrile function to give a monocarboxylic acid or its esters. This becomes the chief reaction with cycles of seven to ten carbon atoms and provides a way of making new alicyclic aliphatic compounds which may be used as softeners, surface-active agents, oil-additives, etc.

Examples which are typical of the preparation of 2-acyl-2-cyanobutenyl cycloalkanones follows:

Example 1

To a stirred mixture of 24.8 grams of 2-acetyl cyclohexanone, twelve grams of tert.-butyl alcohol, and 1.5 grams of benzyl trimethyl ammonium hydroxide (40% aqueous solution), there was gradually added fourteen grams of 1-cyano-1,3-butadiene during the course of ten minutes while the reaction temperature was maintained at 35°-40° C. The mixture was thereafter stirred for one hour at room temperature and then allowed to stand for twenty-four hours. The alkali was then neutralized with dilute hydrochloric acid, and the oil was taken up in ethylene dichloride and washed with water. The product was evaporated under reduced pressure to remove the solvent and moisture, and the residual oil was fractionally distilled in vacuo. The crude 2-acetyl-2-(δ-cyanobutenyl) cyclohexanone distilled over as a pale yellow oil at 155°-160° C./0.4 mm. in a yield of thirty-one grams. Upon redistillation, it boiled at 184°-187° C./0.8 mm. The compound can be crystallized from ethanol at 0° C. and forms colorless crystals which melt at 39°-40° C.

Upon hydrolysis with an excess of boiling 20% sodium hydroxide solution, the above product yields the di-sodium salt of 5-acetyl-nonene-1,9-dicarboxylic acid, from which the free acid can be obtained by acidification.

Example 2

To a stirred mixture of 42.8 grams of 2-acetyl cyclopentanone, twenty-one grams of tert.-butyl alcohol, and three grams of benzyl trimethyl ammonium hydroxide (40% solution), there was gradually added twenty-seven grams of 1-cyano-1,3-butadiene during the course of twenty minutes at 38°-40° C. The mixture was stirred thereafter for about twenty hours at room temperature and was then neutralized with dilute hydrochloric acid. The product was washed with an equal volume of water, dried, and distilled in vacuo.

The 2-acetyl-2-(δ-cyanobutenyl) cyclopentanone distilled over at 150°-155° C./0.1 mm. as a faintly yellow oil in a yield of sixty grams. Upon redistillation, it boiled at 150°-153° C./0.1 mm.

Upon hydrolysis with an excess of boiling 10%-20% potassium hydroxide solution, the above product yields the di-potassium salt of 4-acetyl-octene-1,8-dicarboxylic acid, from which the free acid can be obtained upon acidification.

Example 3

To a stirred mixture of 27.2 grams of 2-propionyl cyclohexanone, thirteen grams of tert.-butyl alcohol, and two grams of benzyl trimethyl ammonium hydroxide (40% solution), there was gradually added fourteen grams of 1-cyano-1,3-butadiene during the course of ten minutes at 38°-40° C. The mixture was stirred thereafter for twenty hours, neutralized with dilute hydrochloric acid, washed, dried, and distilled in vacuo.

The (δ-cyanobutenyl)-2-propionyl cyclohexanone distilled over at 160°-170° C./0.1-0.5 mm. as a viscous pale yellow oil in a yield of twenty-six grams. Upon redistillation, it boiled at 147°-149° C./0.06 mm.

Upon hydrolysis by boiling with an excess of 20% sodium hydroxide solution, the above product yields the di-sodium salt of 5-propionyl-nonene-1,9-dicarboxylic acid, from which the free acid can be obtained by acidification.

Example 4

A mixture of 46.7 grams of 2-n-butyryl cyclohexanone, twenty-three grams of tert.-butyl alcohol, three grams of 40% benzyl trimethyl ammonium hydroxide solution, and twenty-two grams of 1-cyanobutadiene-2,4 was stirred for several hours at 35°-40° C. and allowed to stand for twenty-four hours at room temperature. The product was then acidified with dilute hydrochloric acid, washed with water, dried, and distilled in vacuo.

The 2-butyryl-2-(δ-cyanobutenyl) cyclohexanone distilled over at 170°-180° C./0.5-0.8 mm. as a viscid pale yellow oil in a yield of fifty-five grams. Upon redistillation, it boiled at 156°-158° C./0.08 mm.

Example 5

To a stirred solution of 15.4 grams of 2-acetyl cycloheptanone, ten grams of tert.-butyl alcohol, and one gram of benzyl trimethyl ammonium hydroxide (40% solution), there was gradually added 7.9 grams of 1-cyano-1,3-butadiene while the exothermic reaction was held at 37°-45° C. by occasional cooling. The mixture was allowed to stand for twenty-four hours at room temperature. It was then acidified with dilute hydrochloric acid, washed with water, and distilled in vacuo.

The 2-acetyl-2(δ-cyanobutenyl)cycloheptanone distilled over at 165°-172° C./0.1 mm. as a pale yellow oil in a yield of eighteen grams. Upon redistillation, it boiled at 155° C. at 0.08 mm. Upon saponification with excess 25% sodium hydroxide solution, it yields the di-sodium salt of 5-acetyl-decene-1,10-dicarboxylic acid, from which the free acid can be obtained upon acidification.

In the same way, other 2-acyl cycloalkanones may be reacted with 1-cyano-1,3-butadiene in the presence of an alkaline catalyst to introduce a cyanobutenyl group in the 2-position.

We claim:

1. A method for preparing 2-acyl-2-(4''-cyanobutenyl)-cycloalkanones which comprises reacting in the presence of an alkaline condensing agent one mole of 1-cyano-1,3-butadiene with a mole of an acyl cycloalkanone of the formula

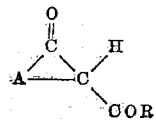

where A is a divalent hydrocarbon group having three to four carbon atoms in an alkylene chain between the keto group and the 2-carbon atom carrying an acyl group, —COR, wherein R represents an alkyl group of not over three carbon atoms.

2. A method of preparing 2-acyl-2-(4'-cyanobutenyl)-cyclohexanones which comprises reacting in the presence of an alkaline condensing agent one mole of 1-cyano-1,3-butadiene with a mole of an acyl cyclohexanone of the formula

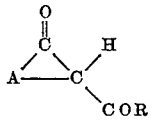

wherein A is an alkylene chain of four carbon atoms and R is an alkyl group of not over three carbon atoms.

3. A method of preparing 2-acetyl-2-(4'-cyanobutenyl)-cyclohexanone which comprises reacting in the presence of an alkaline condensing agent one mole of 1-cyano-1,3-butadiene with one mole of 2-acetyl cyclohexanone.

4. A method of preparing 2-acyl-2-(4'-cyanobutenyl)-cyclopentanones which comprises reacting in the presence of an alkaline condensing agent one mole of 1-cyano-1,3-butadiene with a mole of an acyl cyclopentanone of the formula

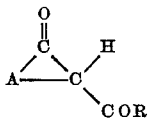

wherein A is an alkylene chain of three carbon atoms and R is an alkyl group of not over three carbon atoms.

5. A method of preparing 2-acetyl-2-(4'-cyanobutenyl)-cyclopentanone which comprises reacting in the presence of an alkaline condensing agent one mole of 1-cyano-1,3-butadiene with a mole of 2-acetyl cyclopentanone.

6. As a new compound, a 2-acyl-2-(4'-cyanobutenyl)-cycloalkanone of the formula

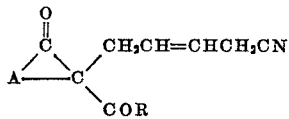

wherein A is a divalent hydrocarbon group having three to four carbon atoms in an alkylene chain between the keto group and the 2-carbon atom carrying an acyl group, —COR, wherein R represents an alkyl group of not over three carbon atoms.

7. As a new compound, a 2-acyl-2-(4'-cyanobutenyl)-cyclohexanone of the formula

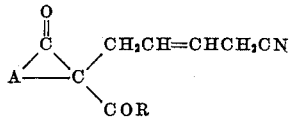

wherein A is an alkylene chain of four carbon atoms and R is an alkyl group of not over three carbon atoms.

8. As a new compound, 2-acetyl-2-(4'-cyano-2'-butenyl)-cyclohexanone.

9. As a new compound, 2-propionyl-2-(4'-cyano-2'-butenyl)-cyclohexanone.

10. As a new compound, a 2-acyl-2-(4'-cyanobutenyl)-cyclopentanone of the formula

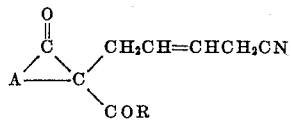

wherein A is an alkylene chain of three carbon atoms and R is an alkyl group of not over three carbon atoms.

11. As a new compound, 2-acetyl-2-(4'-cyano-2'-butenyl)-cyclopentanone.

HERMAN A. BRUSON.
THOMAS W. RIENER.

REFERENCES CITED

The following references are of record in the file of this patent:

UNITED STATES PATENTS

| Number | Name | Date |
|---|---|---|
| 2,073,363 | Carothers et al. | Mar. 9, 1937 |
| 2,280,790 | Bruson | Apr. 28, 1942 |
| 2,386,737 | Bruson | Oct. 9, 1945 |
| 2,394,962 | Bruson | Feb. 12, 1946 |
| 2,403,570 | Wiest | July 9, 1946 |

FOREIGN PATENTS

| Number | Country | Date |
|---|---|---|
| 796,001 | France | Mar. 27, 1936 |